US008943204B2

(12) United States Patent
Caldeira de Andrada et al.

(10) Patent No.: US 8,943,204 B2
(45) Date of Patent: Jan. 27, 2015

(54) METHOD AND SYSTEM FOR CONSERVING NETWORK RESOURCES WHEN SENDING INFORMATION TO MOBILE DEVICES

(75) Inventors: Mauricio Pati Caldeira de Andrada, South Plainfield, NJ (US); Xin Ren, Edison, NJ (US); Anthony Dennis, Flemington, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 325 days.

(21) Appl. No.: 13/356,434

(22) Filed: Jan. 23, 2012

(65) Prior Publication Data

US 2013/0191544 A1    Jul. 25, 2013

(51) Int. Cl.
*G06F 15/173*    (2006.01)

(52) U.S. Cl.
USPC ............ 709/226; 717/171; 709/203; 709/219

(58) Field of Classification Search
None
See application file for complete search history.

(56) References Cited

U.S. PATENT DOCUMENTS

| | | | | |
|---|---|---|---|---|
| 6,807,558 B1 * | 10/2004 | Hassett et al. | ................ | 709/203 |
| 6,876,747 B1 * | 4/2005 | Faccin et al. | .................. | 380/247 |
| 7,200,390 B1 * | 4/2007 | Henager et al. | ................ | 455/419 |
| 7,277,911 B2 * | 10/2007 | Cheah | ............................ | 709/201 |
| 2002/0053029 A1 * | 5/2002 | Nakamura et al. | ............ | 713/201 |
| 2006/0253675 A1 * | 11/2006 | Johannes Bloks | ............ | 711/167 |
| 2007/0005755 A1 * | 1/2007 | Humphries | .................... | 709/224 |
| 2011/0040895 A1 * | 2/2011 | Griffin et al. | ................. | 709/248 |
| 2012/0210313 A1 * | 8/2012 | Cooley et al. | ................. | 717/171 |
| 2012/0281561 A1 * | 11/2012 | Shukla et al. | ................. | 370/252 |

OTHER PUBLICATIONS

David C. Salyers, "Improving Network Efficiency: PhD Candidacy Proposal," 2007.

* cited by examiner

*Primary Examiner* — Jason K. Gee
*Assistant Examiner* — Henry Tsang

(57) ABSTRACT

Information is provided to a mobile device while reducing the number of traffic channels established over a predetermined time period. A pull client on a mobile device receives requests for information from applications on the mobile device. The pull client creates a timing list which includes the timing requirements for each application. Applications that have overlapping timing requirements are grouped together into the same timing group. Once the time for creating a traffic channel for one of the groups arrives, a traffic channel is created between the mobile device and a carrier gateway. Information for each respective application within the same timing group is obtained through the network using the same traffic channel. When the requested information is provided to all applications within the same timing group, the traffic channel is released after a predetermined time. The method is repeated for a next timing group entry.

22 Claims, 5 Drawing Sheets

METHOD AND SYSTEM FOR CONSERVING NETWORK RESOURCES WHEN SENDING INFORMATION TO MOBILE DEVICES

BACKGROUND

In recent years, the use of mobile devices and wireless networks has become increasingly widespread. As the use of the mobile devices has increased, the number and quality of additional features made available with the devices has also dramatically increased. Modern networks and many mobile devices support wireless packet data communication to and from the mobile devices in addition to the more traditional voice and messaging features. The data communication capabilities offer users a wide range of desirable communication features, such as email, web surfing, application selection and downloading, media content selection and downloading, etc.

For many of the features or services, the mobile devices generally operate as clients with respect to service provider servers. With the client-server model, the mobile devices themselves typically initiate all data communications with the service provider servers. For example, wireless mobile devices now may include applications that provide useful and/or entertaining features for a user. Many of these features make information requests by communicating with a server. In some cases, the information requests may be periodic. For example, the mobile device may include a weather application that updates every 15 minutes; a news application that updates every 10 minutes; or a stock application that updates every 5 minutes. By making periodic updates, the user is provided with "up-to-date" information on their mobile device. However, each update requires that the mobile device send a request for the update to the respective server.

As a result, every time there is an information request by any application, the mobile device establishes a traffic (i.e., communication) channel with the server over a wireless network. Further, every time a traffic channel is established between a mobile device and the server, the mobile device, the associated subscriber account, and the requesting application is authenticated and/or validated. Accordingly, a substantial amount of signaling (i.e., "handshaking") is typically performed between a mobile device and the network in order to facilitate each communication with a server. However, once the communication with the network is completed for a particular application of the mobile device, the traffic channel is released after a predetermined time (e.g., 7 seconds). Any subsequent update (i.e., communication with the same or a different server through the network) requires a traffic channel to be re-established, requiring significant overhead in terms of network and communication resources. As mobile devices are becoming "smarter" by introducing an ever increasing amount of features, the resource problem of having to repeatedly establish a traffic channel is further exacerbated.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

Figure 1:
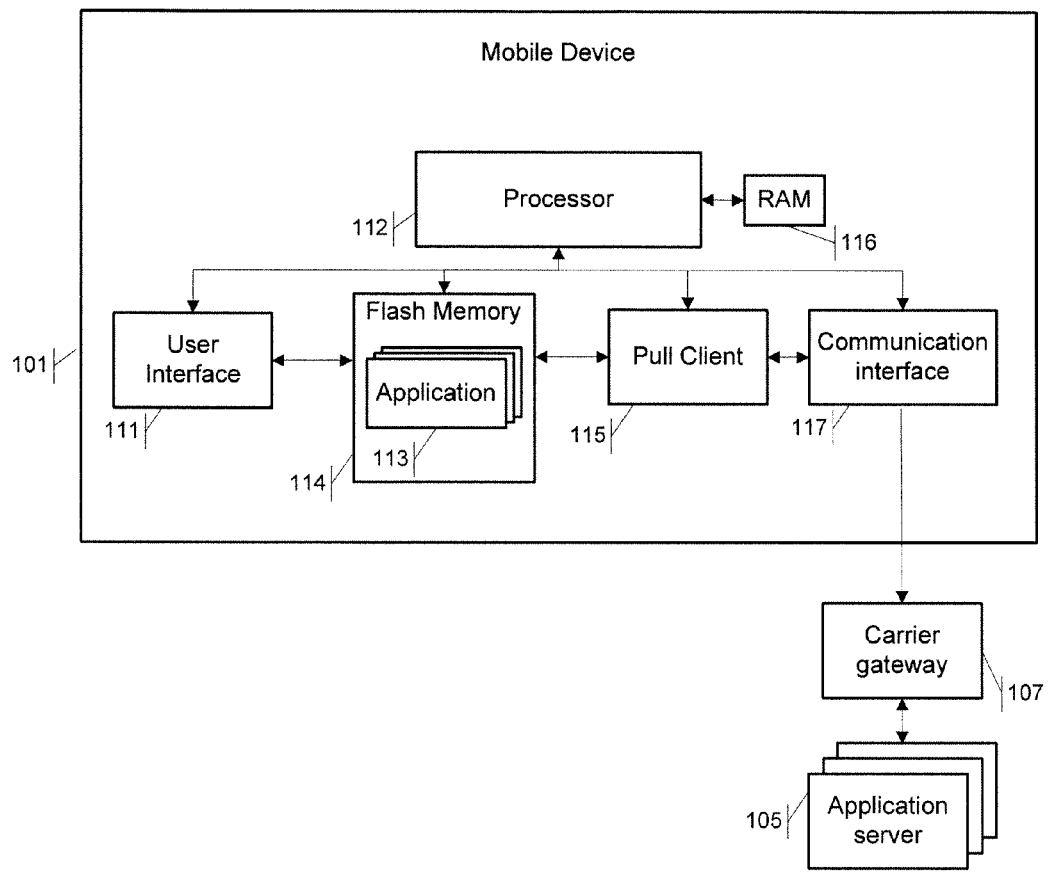
FIG. 1 is a block diagram depicting an exemplary system which makes periodic updates to obtain content for a user of a mobile device.

The various examples discussed below enable applications on a mobile device to obtain content from one or more application servers in an efficient way. FIG. 1 illustrates a block diagram of an exemplary system which provides content information to a mobile device 101. Mobile device 101 includes a user interface 111, one or more applications 113, and a communication interface 117. Via the interface 117, the mobile device 101 can communicate with a carrier gateway 107 over a wireless network (not shown) to obtain content from application servers 105.

In the example of FIG. 1, a microprocessor 112 serves as a programmable controller or processor for the mobile device 101, in that it controls operations of the mobile device 101 in accord with programming that it executes, for all normal operations, for operations involved in the authentication and identification procedure, operations of the pull client 115, and operations of the communication interface 117. In the example, the mobile device 101 includes flash type program memory 114, for storage of various "software" or "firmware" program routines and mobile configuration settings, such as mobile telephone number (MTN or MDN), etc. The mobile device 101 may also include a non-volatile random access memory (RAM) 116 for a working data processing memory. In a present implementation, the flash type program memory 114 stores firmware such as a boot routine, device driver software, an operating system, call processing software, and any of a wide variety of other applications. The memories 114, 116 also store various data, such as telephone numbers and server addresses, downloaded data such as multimedia content, and various data input by the user. Programming stored in the flash type program memory 114 is loaded into and executed by the microprocessor 112.

The mobile device 101 communicates through a wireless mobile communication network (not shown in FIG. 1) operated by a network services provider or carrier. The carrier network offers transport and feature functions for voice communications, messaging communications, and various types of data communications. At least for some of the data services, the mobile device links through the mobile communication network to a carrier gateway 107 to access relevant carrier network resources and to establish data communications through the network with data services offered by the network carrier and/or other service providers represented by the application servers 105 in the drawing. The carrier gateway 107 may be a base station, network switch, and/or gateway server resident in or on the periphery of the carrier's mobile communication network. The carrier gateway 107 authenticates the mobile device 101 and, upon successful authentication, allows the mobile device 101 to access network provided communication services. Although only one gateway 107 is shown for convenience, there may be any number of such gateways in or coupled to the wireless communication network. The mobile device 101 may be a cellphone, smart-phone, tablet computer, or other mobile device capable of communicating with and connecting to carrier gateway 107 over the wireless carrier network or other appropriate network (e.g., a WI-FI network) providing network connectivity to the carrier network.

Mobile device 101 includes a communication interface 117 for communicating with the wireless network. For data services, the interface enables the mobile device 101 to communicate through the network with the carrier gateway 107. The mobile device also includes one or more elements and programming for providing a user interface 111 for receiving input from a user and presenting information to the user. Also, one or more applications 113 run on the mobile device 101. For example, the applications 113 reside in the flash memory 114. The applications 113 receive and/or transmit input/output commands and/or data using user interface 111, other programming, and communication interface 117. In particular, communication interface 117 allows applications 113 to communicate with application servers, such as application server(s) 105, to send data to or receive data from the application server(s) 105. For communications with a server 105, an application 113 functions as a client or client application.

The mobile device 101 implements a pull communication framework. As a result, mobile device 101 itself initiates requests for transmission to/from carrier gateway 107 and application server 105. From time to time, an application 113 or other program running on mobile device 101 requires a communication session with an application server 105. For discussion purposes, we will assume that it is the application 113 that is ready to communicate with an application server 105. In such a case, the application 113 causes the processor 112 to transmit a request to the communication interface 117. In response to the request, the communication interface 117 establishes communication with the carrier gateway 107 through the mobile network. After authentication/validation of the mobile device 101 and the application 113 with the carrier gateway 107, the interface 117 communicates through the network with the particular application server 105. Once communication with the application server 105 is established, the application 113 and application server 105 exchange data over the established data "connection."

For example, the client application 113 requests information, and the application server 105 sends the requested information in a response. In many traditional data services, the user operates the mobile device to execute the application and initiate a request for user identified information. Increasingly, mobile applications are configured to automatically obtain notifications of updates as events occur. In common examples of automatic requests, the request for data relate to updates to weather, to stock reports, to news, or to any other status information. In an example where the client and server applications implement a pull model to automatically provide notifications or status information, the requests for data take the form of periodic update requests. The request and response is termed a "pull" communication because the client application 113 is effectively "pulling" down data from the server side application 105.

To align the timing of data requests, like the periodic requests to pull down notification or other status data, the mobile device 101 additionally implements a pull client 115 to provide pull data communication capabilities to mobile device 101 and carrier gateway 107. Pull client 115 is a software application running on and/or a hardware module located in mobile device 101 that provides pull data communication functionality to other applications on the mobile device 101. Further, pull client 115 provides coordination between the different applications 113 by grouping information and/or update requests together, thereby facilitating information retrieval and/or updates to several applications in a single traffic channel or session. The grouping and information transfer is discussed in more detail in a later section.

Pull client 115 interfaces with communication interface 117 to establish a connection to carrier gateway 107, when desirable with respect to one or more requests for data for the applications 113 running on the mobile device 101. When the mobile device 101 establishes a network link with the carrier gateway 107, the pull client 115 is configured to establish a traffic channel (i.e., communication session) with the network through the carrier gateway 107. For example, when one or more client applications 113 running on client device 101 request communication with the network for an information update, a single traffic channel enables pull client 115 to receive information to update several applications during that one session before the same traffic channel is released/expires. Thus, several applications are updated without having to establish a new traffic channel for each information request for the different applications. Once the information updates are complete, the traffic channel is released after a predetermined time (e.g., 7 seconds). For example, the network waits for this predetermined time, in which no traffic occurs, to confirm that the mobile device previously using the traffic channel is now idle and that the traffic channel can be released.

The traffic channel is used by the pull client 115 to receive data, messages, notifications, or other transmissions from application server(s) such as 105 to pull client 115 on the mobile device 101. Although many of the examples discussed here relate to periodic requests for notifications or updates, a transmission from the mobile device 101 can include a notification, request or instruction, data, or other transmission for the mobile device 101, for an application 113 running on the mobile device 101, and/or for a user of the mobile device 101. The responsive pull transmission from the application server 105 can include data of any type or length (e.g., a data, audio, video, or other file; an executable program; a software application program or update; a mobile device or application configuration file; or the like). Pull client 115 receives the transmissions from the application server(s) 105, identifies the target recipient of the transmission (e.g., a target recipient application 113), ensures that the target recipient is able to receive the transmission (e.g., by waking-up or beginning execution of the target recipient if necessary), and causes the processor 112 to forward the data contained in the transmission to the target recipient within the mobile device 101.

In one example, the mobile device 101 may run a weather forecast application 113 which provides up-to-date weather information and weather alerts to a user of the mobile device 101. The mobile device 101 may also run a traffic application that provides up-to-date traffic information and related alerts to the user. For example, these applications may have similar update periods (e.g., start at every 10 minutes) which may be deferred up to 2 minutes (i.e., tolerance). If there is an overlap between the earliest time these applications can start and the latest time these applications can start, the pull client groups these applications together, and adjusts the timing of each application such that they both trigger during the same traffic channel session. Accordingly, upon beginning execution, the weather forecast application and the traffic update application requests are scheduled by the pull client 115 to be grouped into the same timing group. Thus, by grouping together applications with similar timing requirements, the pull client 114 allows a single traffic channel to be used by the carrier gateway 107 to provide the corresponding applications running on the device 101 with the requested information. This periodic update is accomplished on a single traffic channel, thereby obviating the need for establishing consecutive network-resource-intensive traffic channels.

The pull client 115 groups applications 113 with similar update time requirements (e.g., overlapping minimum and maximum possible trigger times). For each group, the trigger time is adjusted such that all applications within the group are updated during the timing for the same traffic channel. Once the update for the group of applications completes, the traffic channel is released after the predetermined time. If there are several timing groups of applications (i.e., applications that are separated into different timing groups but having start timing before expiration of the predetermined time following updates for a preceding group), a similar sequence is repeated for each group of applications. For example, the updates are provided by application server(s) 105 through carrier gateway 107 without release and recreation of the traffic channel for each application in a respective timing group, or in some cases, between updates for applications in several timing groups.

The automatic grouping by the pull client 115 of applications 113 with similar information update requirements reduces the signaling received by the carrier gateway 107 and application server. By reducing the number of sessions that require authentication at the carrier gateway 107 and session set-up through the network to/from the mobile device 101, the communication network and the servers' communication and processing loads are reduced.

Figure 2:
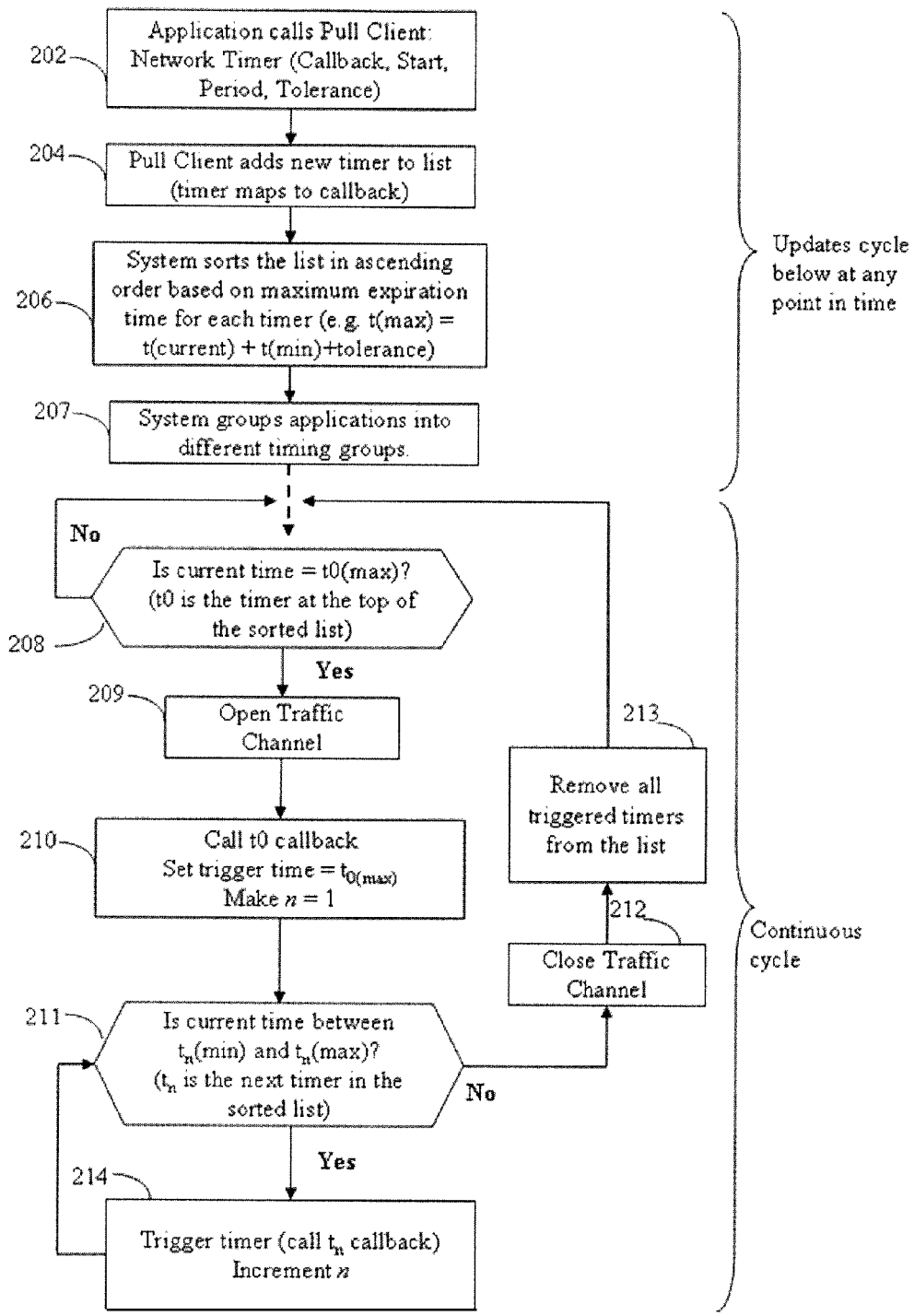
FIG. 2 is a flow diagram illustrating an exemplary list processing and timing procedure of a pull client on a mobile device.

While the general functionality of pull client 115, the carrier gateway 107, and the application server(s) 105 have been described with reference to FIG. 1, a more detailed example of the process or operations is provided in FIG. 2. FIG. 2 is a flow diagram illustrating an exemplary interaction between a mobile device 101 and an application server 105.

In step 202, an application 113 running on mobile device 101 generates and transmits a data request to pull client 115. The request includes the network timer information including delay (for triggering the callback from when the request is sent), period, the time tolerance, and a callback of the particular application to be called when the timer expires. For example, the delay may be 10 minutes while the tolerance may be in milliseconds (e.g., 100 ms). Although the period may be provided, the data request may not be periodic. Instead, it could be a single information request. As to callback, it is an application ID or function pointer and the like that allows the responding server to send back data in a manner that the processor can effectively route to the appropriate application. Several other applications 113 on mobile device 101 may also perform similar requests with identical or alternate respective network timer information.

In step 204, the pull client 115 manages each request from the application(s) 113. For example, the pull client 115 adds each set of timing information to a timing list that the pull client 115 maintains.

In step 206, the pull client 115 sorts the timing list in $t^{max}$ order, such as in an ascending order (i.e., from the lowest to the highest $t^{max}$). In other examples, the pull client 115 may sort in an ascending based on $t^{min}$, or a descending order (based on $t^{max}$ or $t^{min}$). Accordingly, a requested timing array/queue is maintained by the pull client 115:

$$[t_1^{min}, t_1^{max}], [t_2^{min}, t_2^{max}], \ldots, [t_n^{min}, t_n^{max}] \ldots, \text{where}$$

$t_n^{min}$ is the earliest time timer n can be triggered for application n, $t_n^{max}$ the latest time timer n can be triggered, and n is the number of applications that have requested an information update.

In one example, the $t^{min}$ and $t^{max}$ are calculated. For example, in an initial evaluation by the pull client 115:

$t_n^{min} = t_{current} + $ delay where the delay is provided by each respective application as part of the request and $t_{current}$ is the time the request is sent.

$$t_n^{max} = t_n^{min} + \text{tolerance}.$$

Figure 3A:
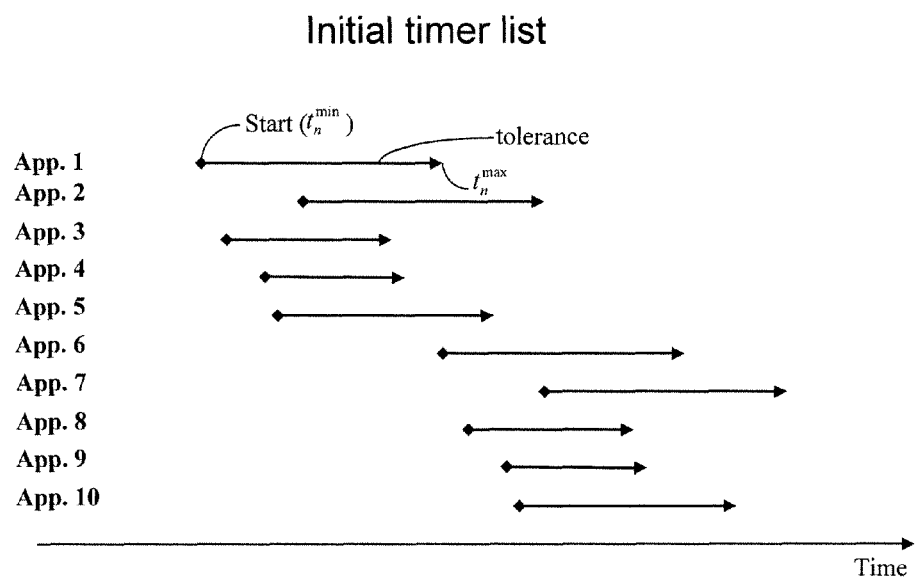
FIG. 3a illustrates an example of an unsorted listing of applications with their respective timing requirements.
Figure 3B:
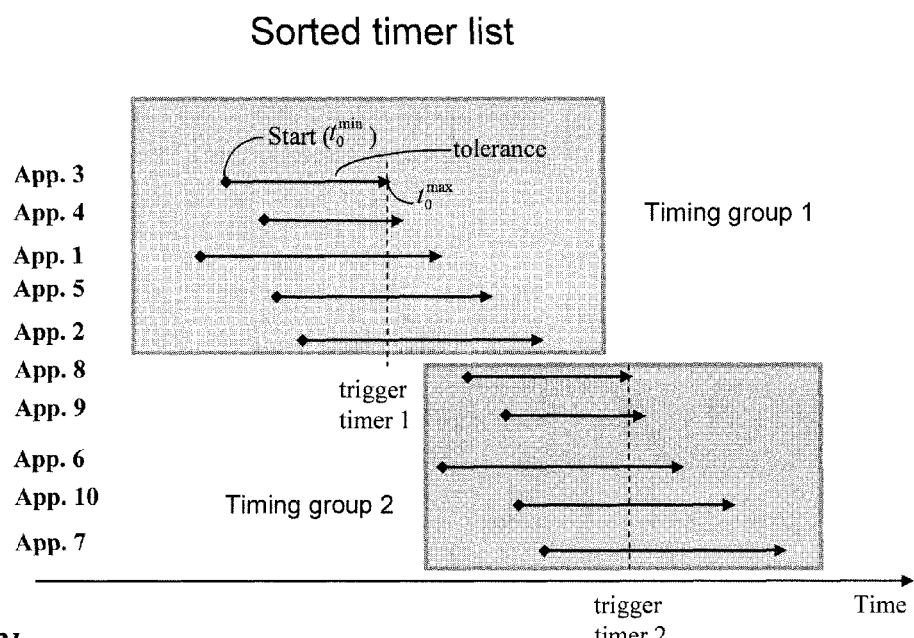
FIG. 3b illustrates an example of sorted applications that are grouped into different timing groups.

Accordingly, in the first iteration, the minimum possible trigger time for the timer n is equivalent to the delay plus the current time. The maximum possible trigger time for timer n is equivalent to the current time plus delay plus tolerance. All timers of applications that have a timing that overlaps between $t_n^{min}$ and $t_n^{max}$ are grouped together. By way of example, FIG. 3a illustrates an example of an unsorted listing of applications with their respective timing requirements. FIG. 3b illustrates the applications having been sorted from the minimum (i.e., earliest) $t^{max}$ to the maximum (i.e., latest) $t^{max}$. FIG. 3b also illustrates the grouping of applications into different timing groups (i.e., step 207 in FIG. 2). In the example of FIG. 3b, timing group 1 comprises applications 3, 4, 1, 5, and 2 (in ascending $t^{max}$ order). Similarly, timing group 2 comprises applications 8, 9, 6, 10, 7. Thus, the applications are grouped such that the trigger in a timing group (e.g., the minimum $t^{max}$) falls after the maximum $t^{min}$ of each application in the timing group.

Referring back to FIG. 2, it should be noted that steps 202 to 207 are updated every time there is a request for information from any application 113. Further, for periodic signals, the timer is adjusted after the completion of the first timer execution. For example, $$t_n^{min} = t_n^{last} + \text{period; and}$$

$$t_n^{max} = t_n^{min} + \text{tolerance; where}$$

$t_n^{last}$ = the last time the timer expired for application n

Steps 208 to 214 reflect cycles that are continuous. In this regard, in step 208, the pull client 115 determines whether the $t_n^{max}$ of the present timing group (i.e., $t_0^{max}$) has expired. If the time for the minimum $t^{max}$ for the timing group has not arrived, the traffic channel is kept dormant (i.e., traffic channel is not active). However, if the time for $t_0^{max}$ has arrived, then the traffic channel is established in step 209, allowing information to be accessed from the network. Thus, a traffic channel is created with a carrier gateway 107, thereby allowing communication with one or more application server(s) 105 to retrieve information for applications 113 scheduled for this particular timing group.

In step 210, the callback associated with the trigger is invoked, thereby providing a specific start point. The trigger time for the application is set to $t_0^{max}$ and n set to 1 in preparation for the next trigger. Thus, the next trigger will be n=1.

In step 211, the pull client determines whether the present time is between $t_0^{min}$ and $t_0^{max}$. Put differently, the pull client determines whether the time for a trigger has arrived for the next application on the sorted list. Upon determining that the time for a trigger has arrived, in step 214, the timer for the application is triggered. Further, the application n is incremented (e.g., the next application becomes the present application for the upcoming timing trigger on the sorted list).

However, upon determining that the time for a trigger has not arrived, the traffic channel is closed in step 212. Further, in step 213, all triggered timers are removed from the sorted timing list and the method continues with step 208.

In one embodiment, the sequence of applications that are serviced within a timing group is randomized. The randomization occurs in step 210. For example, the randomization may prevent bursts of data at certain times (e.g., as soon as the traffic channel is created) which burdens the network. In this regard, the time for each particular application may be deferred such that each application has a slightly different timer while the same traffic channel session is used. For example, for a group of applications sharing the same traffic channel (i.e., are in the same timing group) and wherein: $t_i^{min} < t_0^{max}$, the trigger timer for each application is modified, as discussed below.

In this example, the particular timer for each application is modified slightly by the following algorithm:

$$t_i^{trigger} = rand([t_{i-1}^{trigger}, \min(t_i^{max}, t_{i-1}^{trigger} + d)])$$

for $i > 1$ where:
d=network dormancy timer (i.e., how long the network waits with no traffic before disabling the traffic channel);
rand( )=random number within an interval;
max( )=maximum value within an interval; and
min( )=minimum value within an interval.

Accordingly, by staggering the timing for each application, the foregoing randomization prevents bursts of data traffic over the network once a traffic channel is created. For example, each application is accommodated at a slightly different time during the same traffic channel.

Referring back to FIG. 2, once a timer for a group of applications 113 is active, a traffic channel is established between mobile device 101 and the carrier gateway 107. For example, a wireless data link from mobile device 101 running application 113 and pull client 115 is established with carrier gateway 107 through a carrier network. The data link is a wireless over the air interface between the mobile device 101 and the serving base station or wireless access point (shown in a later figure). From the base station or access point to the gateway, the communication may use wire, fiber, or other transport media. In addition to establishing a wireless data link, the mobile device 101 is authenticated for service on the carrier network for voice, data, and/or other communication. Alternatively or additionally, the wireless data link can be established between mobile device 101 and carrier gateway 107 through a WI-FI or other appropriate network. The data link can thus be a wireless over the air connection between the mobile device and a WI-FI access point, and/or a wire, fiber, or other connection from the access point to the carrier gateway 107.

When a traffic channel between mobile device 101 and carrier gateway 107 is established, an application 113 running on mobile device 101 and requiring communication functionality generates and transmits a data communication request to pull client 115.

An authentication and registration request to establish a traffic channel includes an application ID (received from each application 113), as well as one or more identifiers for the mobile device 101 and/or pull client 215 transmitting the request. Examples of identifiers for the mobile device 101 include a mobile directory number (MDN), a mobile identification number (MIN), an international mobile subscriber identity number (IMSI), a hardware ID such as a mobile equipment identifier (MEID), indicators for the type and version of operating system and firmware running on the mobile device 101, indicators for the model type and number of the mobile device 101, and the like. Identifiers for the mobile device 101 also include connection parameters, such as the device IP address and connection type. Identifiers for the mobile device 101 can also include an encryption key for securely communicating with the device. In one example, the authentication and registration request includes the received application ID, as well as the MDN, the hardware ID (MEID), the device IP address, the connection type, the OS type, the firmware, the model number, and optionally the encryption key of the mobile device 101.

Upon receiving the authentication and registration request from the pull client 115, the carrier gateway 107 proceeds to authenticate the mobile device 101 to determine whether the mobile device 101 is an authorized device. In particular, the carrier gateway 107 authenticates the mobile device 101 using the one or more mobile device identifiers received in the authentication request. For example, the carrier gateway 107 may send an IP address received as part of the authentication request to an authentication server of the carrier network, receive an identifier for an MDN that is associated with the IP address in the authentication server, and verify that the identifier for the MDN received from the authentication server matches the MDN received in the authentication request. In addition, the carrier gateway 107 may send a received hardware ID to a billing server of the carrier network, receive an identifier for an MDN that is associated with the hardware ID in the billing server, and verify that the received identifier for the MDN matches the MDN received in the authentication request. The carrier gateway 107 further validates the application 113 having made the registration request using the application ID identifier received as part of the authentication request. For example, the carrier gateway 107 may send the application ID to an application validation server of the carrier network, and receive a response indicating whether or not the application is approved for use with pull data functionality on the carrier network. The device authentication, billing, and application validation servers may run on the same platform and/or be incorporated in the carrier gateway, or one or more of those server functions may be implemented on other hardware platforms in communication with the gateway platform via a network.

Upon successful authentication of the mobile device 101, the carrier gateway 107 registers a session for the mobile device 101, thereby creating a traffic channel. The registration includes generating and assigning a session ID identifier. The carrier gateway 107 maintains a database of all connection sessions currently supported for all mobile devices 101. Upon registration of the session, the carrier gateway 107 stores in its database the session ID identifier and data associated with the session, such as the one or more mobile device identifiers (e.g., an MDN and/or hardware ID) received as part of the authentication and registration request. In general, a traffic channel (i.e., session ID) is associated with a mobile device 101, and the same session ID is used to send all communications from carrier gateway 107 to pull client 115, regardless of the application 113 associated with the communication.

As discussed before, the traffic channel established remains open for all applications 113 associated with a particular timing group. Thus, upon a single successful validation, the connection is maintained with the same session ID.

The pull client 115 and carrier gateway 107 can thus continue to use the same traffic channel that was established, identified, and registered. In particular, the connection session is used without requiring re-authentication of mobile device 101 or re-registration of a connection session with the carrier gateway 107. As a result, pull client 115 and carrier gateway 107 can provide information to the respective applications with substantially less signaling.

Figure 4:
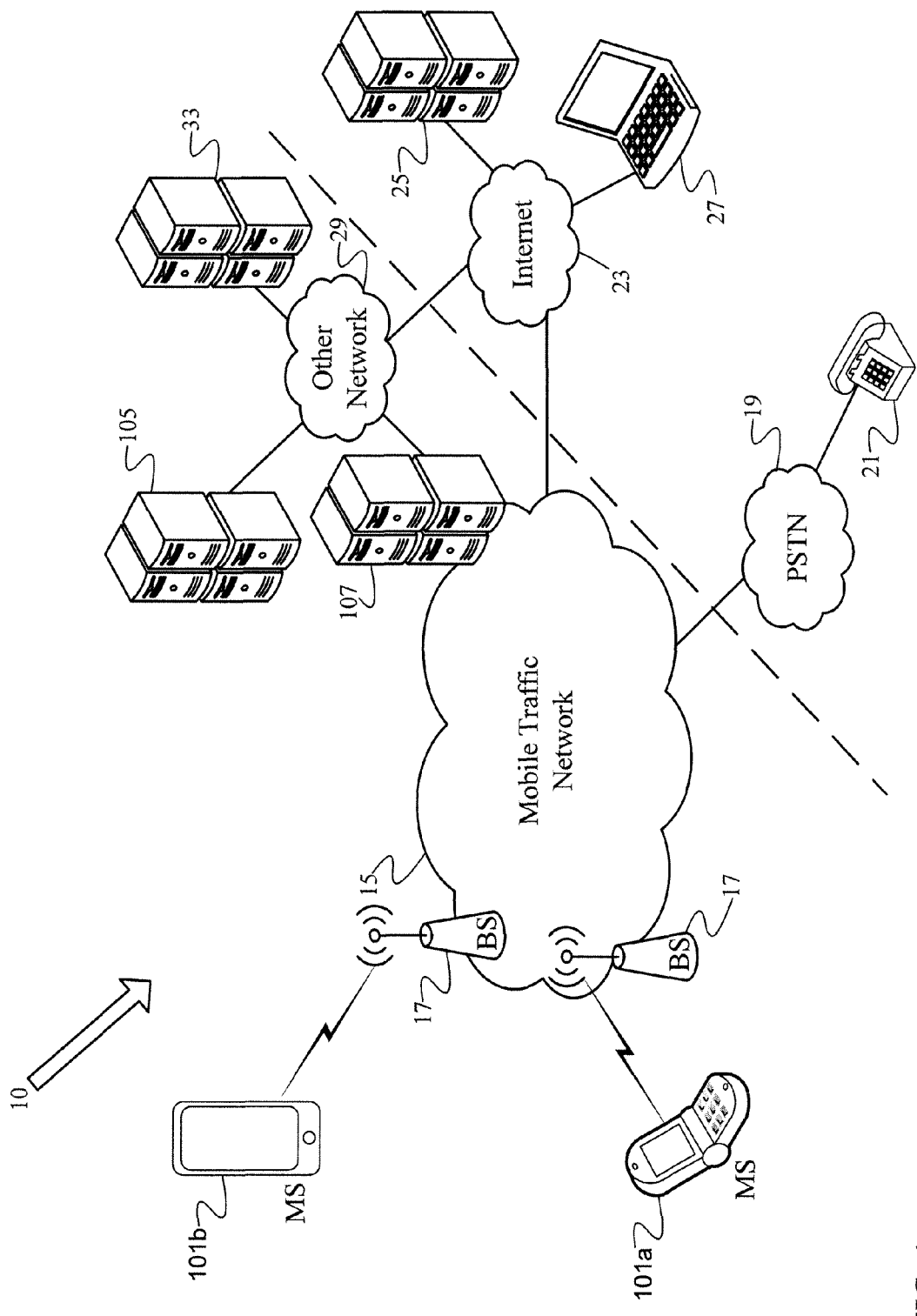
FIG. 4 is a high-level functional block diagram of an example of a system of networks/devices that provide various communications for client mobile devices and support an example of providing information to mobile devices.

FIG. 4 illustrates a system 10 offering a variety of mobile communication services, including communications for device authentication and for obtaining data services used by mobile device applications. The example shows simply two mobile devices (MDs) 101a and 101b as well as a mobile communication network 15. The devices 101a and 101b are examples of mobile devices that may be used for the pull data service. However, the network 15 will provide similar communications for many other similar users as well as for mobile devices/users/applications that do not participate in the pull data service. The network 15 provides mobile wireless communication services to the devices 101a and 101b as well as to other mobile devices (not shown), for example, via a number of base stations (BSs) 17. The present techniques may be implemented in any of a variety of available mobile networks 15 and/or on any type of mobile device compatible with such a network 15, and the drawing shows only a very simplified example of a few relevant elements of the network 15 for purposes of discussion here.

The wireless mobile communication network 15 might be implemented as a network conforming to the code division multiple access (CDMA) IS-95 standard, the 3rd Generation Partnership Project 2 (3GPP2) wireless IP network standard or the Evolution Data Optimized (EVDO) standard, the Global System for Mobile (GSM) communication standard, a time division multiple access (TDMA) standard, SS7-based networks, Ethernet/IP-based networks, or other standards used for public mobile wireless communications. The mobile devices 101 are capable of voice telephone communications through the network 15, and for the pull data services, the exemplary devices 101a and 101b are capable of data communications through the particular type of network 15 (and the users thereof typically will have subscribed to data service through the network). Alternatively or additionally, the mobile devices 101 may be capable of data communications through a wireless WI-FI or other network.

The network 15 allows users of the mobile devices such as 101a and 101b (and other mobile devices or stations not shown) to initiate and receive telephone calls to each other as well as through the public switched telephone network or (PSTN) 19 and telephone stations 21 connected to the PSTN. The network 15 typically offers a variety of data services via the Internet 23, such as downloads, web browsing, email, etc. By way of example, the drawing shows a laptop PC type user terminal 27 as well as a server 25 connected to the Internet 23; and the data services for the mobile devices 101 via the Internet 23 may be with devices like those shown at 25 and 27 as well as with a variety of other types of devices or systems capable of data communications through various interconnected networks. The mobile devices 101a and 101b of users of the pull data service also can receive and execute applications written in various programming languages, as discussed more later.

Mobile devices 101 can take the form of portable handsets, smart-phones or personal digital assistants, although they may be implemented in other form factors. Program applications, including a pull client application to assist in the pull data service and/or any user applications installed on the device or purchased via on-line services can be configured to execute on many different types of mobile devices 101. For example, a mobile device application can be written to execute on a binary runtime environment for mobile (BREW-based) mobile device, a Windows Mobile based mobile device, Android, I-Phone, Java Mobile, or RIM based mobile device such as a BlackBerry or the like. Some of these types of devices can employ a multi-tasking operating system.

The mobile communication network 10 can be implemented by a number of interconnected networks. Hence, the overall network 10 may include a number of radio access networks (RANs), as well as regional ground networks interconnecting a number of RANs and a wide area network (WAN) interconnecting the regional ground networks to core network elements. A regional portion of the network 10, such as that serving mobile devices 101, can include one or more RANs and a regional circuit and/or packet switched network and associated signaling network facilities.

Physical elements of a RAN operated by one of the mobile service providers or carriers include a number of base stations represented in the example by the base stations (BSs) 17. Although not separately shown, such a base station 17 can include a base transceiver system (BTS), which can communicate via an antennae system at the site of base station 17 and over the airlink with one or more of the mobile devices 101, when the mobile devices 101 are within range. Each base station 17 can include a BTS coupled to several antennae mounted on a radio tower within a coverage area often referred to as a "cell." The BTS is the part of the radio network that sends and receives RF signals to/from the mobile devices 101 that are served by the base station 17.

The radio access networks can also include a traffic network represented generally by the cloud at 15, which carries the user communications and data for the mobile devices 101 between the base stations 17 and other elements with or through which the mobile devices communicate. The network can also include other elements that support functionality other than device-to-device media transfer services such as messaging service messages and voice communications. Specific elements of the network 15 for carrying the voice and data traffic and for controlling various aspects of the calls or sessions through the network 15 are omitted here for simplicity. It will be understood that the various network elements can communicate with each other and other aspects of the mobile communications network 10 and other networks (e.g., the public switched telephone network (PSTN) and the Internet) either directly or indirectly.

The carrier will also operate a number of systems that provide ancillary functions in support of the communications services and/or application services provided through the network 10, and those elements communicate with other nodes or elements of the network 10 via one or more carrier gateways 107 and/or private IP type packet data networks 29 (sometimes referred to as an Intranet), i.e., a private networks. Generally, such systems are part of or connected for communication via the carrier gateways 107 and/or private network 29. Systems outside of the private network could serve the same functions as well. Examples of such systems, in this case operated by the network service provider as part of the overall network 10, which communicate through the carrier gateways 107 and intranet type network 29, include one or more application servers 105, authentication servers 33, billing servers, application validation servers, as well as other servers used for providing the pull data communication service.

A mobile device 101 communicates over the air with a base station 17 and through the traffic network 15 for various voice and data communications, e.g., through the Internet 23 with a server 25 and/or through the carrier gateway 107 and network 29 with application servers 105. The mobile devices 101a, 101b may also communicate over the air through a WI-FI access point or other public network access point, to communicate through the Internet 23 and network 29 with server 25, carrier gateway 107, and/or application servers 105. In particular, mobile device 101 communicates with a carrier gateway (such as carrier gateway 107), which may include carrier gateway 107, authentication server 33, other billing or validation servers, and/or any of base stations 17, base transceiver systems of the base stations 17, traffic network 15, data network 29, and other network elements providing access to the carrier network. Servers such as 105, 33, and 25 may provide any of a variety of common application or service functions in support of or in addition to an application program running on the mobile device 101. However, for purposes of further discussion, we will focus on functions thereof in support of the mobile pull data service. For a given service, including the pull data service, an application program within the mobile device may be considered as a 'client' and the programming at 107, 105, 25, or 33 may be considered as the 'server' application for the particular service. In the example discussed herein, carrier gateway server 107 includes carrier gateway 107, while application server 105 may be a standalone server. However, in other examples, carrier gateway 107 and/or application server 105 may be implemented on other servers such as servers 33 and 25, or implemented on distributed server systems in communication with one or more of networks 15, 29, and 23.

To insure that the application service offered by server 105 is available to only authorized devices/users, the provider of the application service also deploys an authentication server 33. The authentication server 33 could be a separate physical server as shown, or authentication server 33 could be implemented as another program module running on the same hardware platform as the gateway server 107 or the application server 105. Essentially, when the gateway server (server 107 in our example) receives a service request, authentication and registration request, or other request from an application or pull client on a mobile device 101, the gateway server 107 provides appropriate information to the authentication server 33 to allow the authentication server 33 to authenticate the mobile device 101 as outlined herein. Upon successful authentication, the authentication server 33 informs the gateway server 107, which in turn provides access to the service via data communication through the various communication elements (e.g. 29, 15 and 17) of the network 10. A similar authentication function may be provided for data pull services offered via the server 25, either by the authentication server 33 if there is an appropriate arrangement between the carrier and the operator of server 25, by a program on the server 25 or via a separate authentication server (not shown) connected to the Internet 23.

To provide pull data communication services in accordance with the descriptions herein, gateway server 107 or another server or multi-server system implementing the functionality of carrier gateway 107 includes one or more storage devices. The storage devices can be located within server 107, or located outside of server 107 and communicatively connected with server 107. The storage devices store configuration and link data for use by the carrier gateway 107, such as databases storing data on mobile devices authorized to connect to the carrier gateway 107 or to the carrier network, applications authorized to connect to the carrier gateway 107 or to the carrier network, and/or connection sessions supported by the carrier gateway 107 with one or more mobile devices. The pull server databases may include separate databases for each type of data. In one example, a first application database stores information on all applications authorized for pull data services on the network, including a list of the application IDs of applications authorized for pull data functionality. A second device information database stores information on all mobile devices authorized for use on the network, and includes a record for each authorized device storing the device identifiers, connection identifiers, and any other identifiers or information associated with the device. A third connection information database stores information an all connection sessions supported by the carrier gateway 107, and includes a record for each connection session storing the session ID, application ID, device identifiers, and other identifiers or information associated with the connection session. The databases are each stored on one server or several distributed servers of the network.

As shown by the above discussion, functions relating to the pull data service may be implemented on mobile devices, computers, and servers connected for data communication via the components of a packet data network, as shown in FIG. 4. Although special purpose equipment may be used, such devices also may be implemented using one or more hardware platforms intended to represent a general class of data processing device commonly used to run "client" and "server" programming so as to implement the pull client and pull server functionality discussed above, albeit with an appropriate network link and connection capabilities for data communication.

Figure 6:
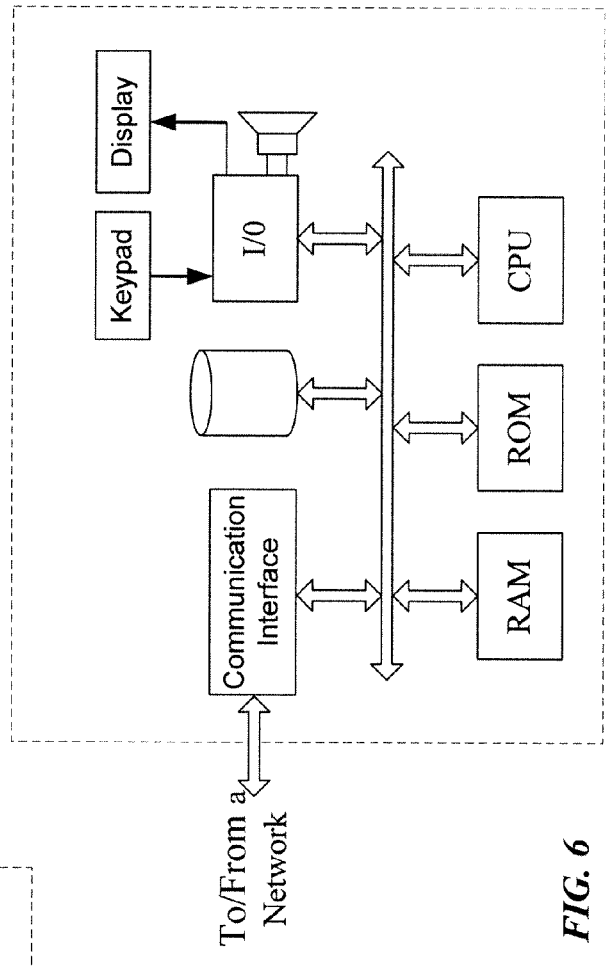
FIG. 6 is a simplified functional block diagram of a personal computer or other work station or mobile device.
Figure 5:
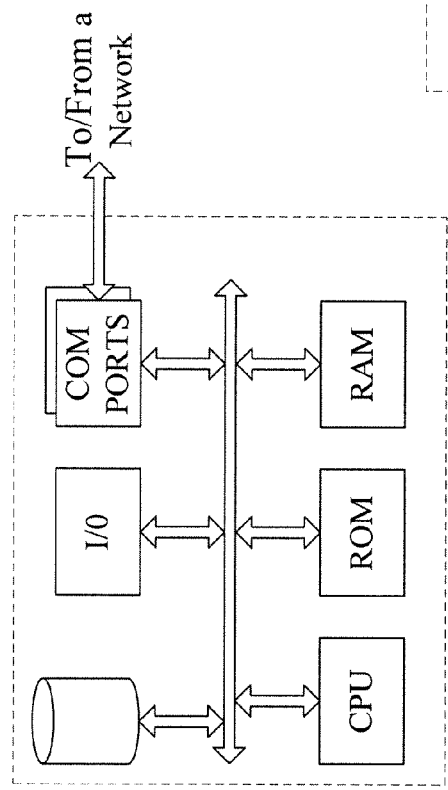
FIG. 5 is a simplified functional block diagram of a computer that may be configured as a host or server.

FIGS. 5 and 6 provide functional block diagram illustrations of general purpose computer hardware platforms. FIG. 5 illustrates a network or host computer platform, as may typically be used to implement a server. FIG. 6 depicts a device with user interface elements, as may be used to implement a personal computer or workstation or to implement a mobile device, such as a portable handset, a smart-phone, tablet computer, a personal digital assistant or other type of mobile station or mobile terminal device, although the device of FIG. 6 may also act as a server if appropriately programmed. It is believed that the general structure and general operation of such equipment as shown in FIGS. 5 and 6 should be self-explanatory from the high-level illustrations.

A general purpose computer configured as a server, for example, includes a data communication interface for packet data communication. The server computer also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load. In this case, such a platform would run application server programming, for example, to receive requests from mobile client applications and send requested content so as to function as one of the servers 105 in FIG. 1.

A user terminal such as a general-purpose personal computer or a mobile device typically comprises a central processor or other processing device, an internal communication bus, various types of memory or storage media (RAM, ROM, EEPROM, cache memory, disk or flash drives for mass storage, etc.) for code and data storage, and one or more network or communication interfaces or ports for communication purposes. The software functionalities involve programming, including executable code as well as associated stored data, e.g. files used for the user applications, and/or pull client application. The software code is executable by the mobile device that functions as the pull client. In operation, the code is stored within the mobile device. At other times, however, the software may be stored at other locations and/or transported for loading into the appropriate mobile device system. Execution of such code by a processor of the mobile device enables the mobile device to implement the methodology for pull data services during a single traffic channel, in essentially the manner performed in the implementations discussed and illustrated herein.

Hence, aspects of the methods of pull data service outlined above may be embodied in programming. Program aspects of the technology may be thought of as "products" or "articles of manufacture" typically in the form of executable code and/or associated data that is carried on or embodied in a type of non-transitory machine readable medium.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

APPENDIX

Acronym List

The description above has used a large number of acronyms to refer to various services, messages, and system components. Although generally known, use of several of these acronyms is not strictly standardized in the art. For the convenience of the reader, the following list correlates terms to acronyms, as used by way of example in the detailed description above.

3GPP2—3'rd Generation Partnership Project 2
API—Application Programming Interface
BREW—Binary Runtime Environment for Mobile
BS—Base Station
BTS—Base Transceiver System
CDMA—Code Division Multiple Access
CD-ROM—Compact Disc Read Only Memory
CMP—Catalogue Management Platform
CPU—Central Processing Unit
CSS—Cascading Style Sheet
DVD—Digital Video Disc
DVD-ROM—Digital Video Disc Read Only Memory
EPROM—Erasable Programmable Read Only Memory
EEPROM—Electrically Erasable Programmable Read Only Memory
EVDO—Evolution Data Optimized
FLASH-EPROM—Flash Erasable Programmable Read Only Memory
GSM—Global System for Mobile
IMSI—International Mobile Subscriber Identity Number
ID—Identification
IT—Information Technology
MD—Mobile Device
MDN—Mobile Directory Number
MEID—Mobile Equipment Identifier
MIN—Mobile Identification Number
MTN—Mobile Telephone Number
PSTN—Public Switched Telephone Network
PROM—Programmable Read Only Memory
RAM—Random Access Memory
RAN—Radio Access Network
ROM—Read Only Memory
TDMA—Time Division Multiple Access
WAN—Wide Area Network

What is claimed is:
1. A method of providing information to a mobile device, comprising steps of:

receiving a request for information, from each of a number of applications on the mobile device, by a pull client on the mobile device;
determining a timing requirement for each application;
creating a timing list, wherein the timing list includes the timing requirements for each application;
grouping applications that have overlapping timing requirements within a timing group;
for each timing group, randomizing a trigger time for each target application scheduled to be updated within a scheduled traffic channel session based on a trigger time of a previous application having a randomized trigger time in the respective timing group, wherein a random sequence of the target applications in the respective timing group is generated;
for each timing group, setting a time to create a traffic channel for the respective timing group based on the randomized trigger times within boundaries of the overlapping timing requirements of the applications grouped within the respective timing group; and
when the time for creating the traffic channel for the respective timing group has arrived:
sending a request to a mobile communication network to establish a traffic channel through the mobile communication network for a session between the mobile device and a carrier gateway;
requesting and receiving information for the applications of the respective timing group from at least one application server during the same established traffic channel session through the mobile communication network;
identifying target applications of the respective timing group;
forwarding information received during the same established traffic channel session through the network, to the target applications; and
releasing the traffic channel after a predetermined time after the forwarding of received information to every target application for the respective timing group has been completed.

2. The method of claim 1, wherein determining the timing requirement for each application comprises obtaining a delay and time tolerance for the information request from each application.

3. The method of claim 2, wherein:
determining the timing requirement for each application further comprises obtaining a period of an information request from at least one of the applications.

4. The method of claim 3, further comprises:
based on the obtained period, adjusting a timer after completion of a last corresponding timer for the information request from the at least one application by determining:
a minimum trigger time is the time when the last corresponding timer expired plus the obtained period, wherein the minimum trigger time represents the earliest time when the request to establish the traffic channel for the at least one application is to be sent to the mobile communication network; and
a maximum trigger time is the time when the last corresponding timer expired, plus the period, and plus the respective time tolerance, wherein the maximum trigger time represents the latest time when the request to establish the traffic channel for the at least one application is to be sent to the mobile communication network.

5. The method of claim 1, wherein the timing list is sorted in an ascending time order from an earliest maximum trigger time to a latest maximum trigger time relative to each of the applications included in the timing list.

6. The method of claim 5, wherein:
a minimum trigger time of each respective application is equivalent to a delay plus a current time for the information request for the respective application, and is an earliest time the request to establish the traffic channel is to be sent to the mobile communication network; and
a maximum trigger time of each application in the respective timing group is equivalent to the delay plus a respective tolerance plus the current time for the information request for the respective application, and is a latest time the request to establish the traffic channel is to be sent to the mobile communication network.

7. The method of claim 1, wherein the grouping of applications comprises:
determining, for each application from which an information request was received, a minimum trigger time and a maximum trigger time requirement for the application, wherein the minimum trigger time is an earliest time the request to establish the traffic channel is to be sent for the application and the maximum trigger time is a latest time the request to establish the traffic channel is to be sent for the application;
determining which applications have an overlap in timing between the minimum trigger time and the maximum trigger time; and
scheduling requesting information from at least one application server during a same traffic channel session for all applications in the respective timing group.

8. The method of claim 7, wherein an earliest possible trigger time in a timing group falls after a latest minimum trigger time of each application in the timing group.

9. The method of claim 1, further comprising:
updating the created timing list every time either a traffic session completes or there is a request for information from at least one of the target applications.

10. The method of claim 1, further comprising for each timing group:
once the respective timing group from the timing list expires, removing the respective timing group from the timing group list; and
replacing the respective timing group with a next timing group.

11. The method of claim 1, wherein randomizing the trigger time further comprises:
having a trigger time of $$t_i^{trigger} = rand([t_{i-1}^{trigger}, \min(t_i^{max}, t_{i-1}^{trigger} + d)])$$

for $i > 1$ where i is the number of applications within a timing group, $t_{i-1}^{trigger}$ is a trigger time of a previous application in the respective timing group to be updated within a scheduled traffic channel session, min ( ) is a function that provides the minimum value within an interval, $t_i^{max}$ is a latest trigger time a timer of a present application of each application scheduled to be updated within a scheduled traffic channel session is triggered, d is a network dormancy timer, and
rand ( ) is a function that provides a random number within an interval.

12. A mobile device comprising:
a user interface;

a storage device for content and holding applications;
a communication interface configured to enable communications via a mobile communication network;
a processor coupled to the user interface and communication interface and having access to the storage device for execution of the applications to enable the mobile device to obtain content related to the applications from application servers via the mobile communication network; and
a pull client, wherein execution of the pull client by the processor configures the mobile device to:
receive a request for information from each of a number of applications on the mobile device;
determine a timing requirement for each application;
create a timing list, wherein the timing list includes the timing requirement for each application and is maintained by the pull client;
group applications that have overlapping timing requirements within one of a plurality of timing groups;
for each timing group, randomize a trigger time for each application in the timing group scheduled to be updated within a scheduled traffic channel session based on a trigger time of a previous application having a randomized trigger time in the respective timing group, wherein a random sequence of the target applications in the respective timing group is generated;
for a first timing group of the plurality of timing groups scheduled to be updated within a scheduled traffic channel session, setting a time to create a traffic channel for the first timing group based on the randomized trigger times within boundaries of the overlapping timing requirements of the applications grouped within the first timing group; and
in response to the arrival of the time for creating a traffic channel:
send a request to the mobile communication network to establish a traffic channel through the mobile communication network for a session between the mobile device and the at least one carrier gateway;
provide authentication information to the carrier gateway;
request and receive information for the respective applications of the first timing group from at least one application server during the same established traffic channel session through the mobile communication network;
identify target applications of the first timing group;
forward information received during the same established traffic channel session through the mobile communication network, to the target applications; and
in response to a determination that the forwarding of received information to every target application of the first timing group is completed, release the traffic channel after a predetermined time.

13. The device of claim 12, wherein execution of the pull client by the processor configures the mobile device to determine the timing requirement for each application configures the mobile device to obtain a delay and a time tolerance for an information request from the application.

14. The device of claim 13, wherein:
execution of the pull client by the processor configures the mobile device to determine the timing requirement for each application further configures the mobile device to obtain a period of an information request for at least one of the applications.

15. The device of claim 14, wherein execution of the pull client by the processor configures the mobile device to determine the timing requirement for each respective application further configures the mobile device to:
based on the obtained period, adjust a timer after completion of a last corresponding time for the information request from the at least one application by determining:
a minimum trigger time is the time when the last corresponding timer expired plus a respective period, and is the earliest time when the request to establish the traffic channel for the at least one application is to be sent by the pull client to the mobile communication network; and
a maximum trigger time is the time when the last corresponding timer expired, plus the period, and plus the respective tolerance, and is the latest time when the request to establish the traffic channel for the at least one application is to be sent by the pull client to the mobile communication network.

16. The device of claim 15, wherein the timing list maintained by the pull client is sorted in an ascending time order from an earliest maximum trigger time to a latest maximum trigger time relative to each of the applications included in the timing list.

17. The device of claim 16, wherein:
a minimum trigger time of each application is equivalent to a delay plus a current time for the information request for the application, and is an earliest time the request to establish the traffic channel is to be sent by the pull client to the mobile communication network for the application; and
a maximum trigger time of each application is equivalent to the delay plus a respective tolerance plus a current time for the information request for the respective application, and is a latest time the request to establish the traffic channel is to be sent by the pull client to the mobile communication network for the application.

18. The device of claim 12, wherein execution of the pull client by the processor configures the mobile device to group applications, the mobile device is further configured to:
determining, for each application from which an information request was received, a minimum trigger time and a maximum trigger time requirement for the application, wherein the minimum trigger time is an earliest time the request to establish the traffic channel is to be sent for the application and the maximum trigger time is a latest time the request to establish the traffic channel is to be sent for the application;
determining which applications have an overlap in timing between the minimum trigger time and the maximum trigger time; and
scheduling requesting information from at least one application server during a same traffic channel session for all applications in the respective timing group.

19. The device of claim 18, wherein an earliest possible trigger time in a timing group falls after a latest minimum trigger time of each application in the timing group.

20. The device of claim 12, wherein execution of the pull client by the processor configures the mobile device to:
update the created timing list every time either a traffic session completes or there is a request for information from at least one of the applications.

21. The device of claim 12, wherein the mobile device is further configured to:
once the first timing group from the timing list expires, remove the first timing group from the timing group list; and
replace the first timing group with a second timing group.

22. The device of claim 12, wherein randomizing the trigger time further comprises:
having a trigger time of $$t_i^{trigger} = rand([t_{i-1}^{trigger}, \min(t_i^{max}, t_{i-1}^{trigger} + d)])$$

for $i > 1$ where i is the number of applications within a timing group, $t_{i-1}^{trigger}$ is a trigger time of a previous application in the respective timing group to be updated within a scheduled traffic channel session, min ( ) is a function that provides the minimum value within an interval, $t_i^{max}$ is a latest trigger time a timer of a present application of each application scheduled to be updated within a scheduled traffic channel session is triggered, d is a network dormancy timer, and rand ( ) is a function that provides a random number within an interval.

* * * * *